Figure 1:
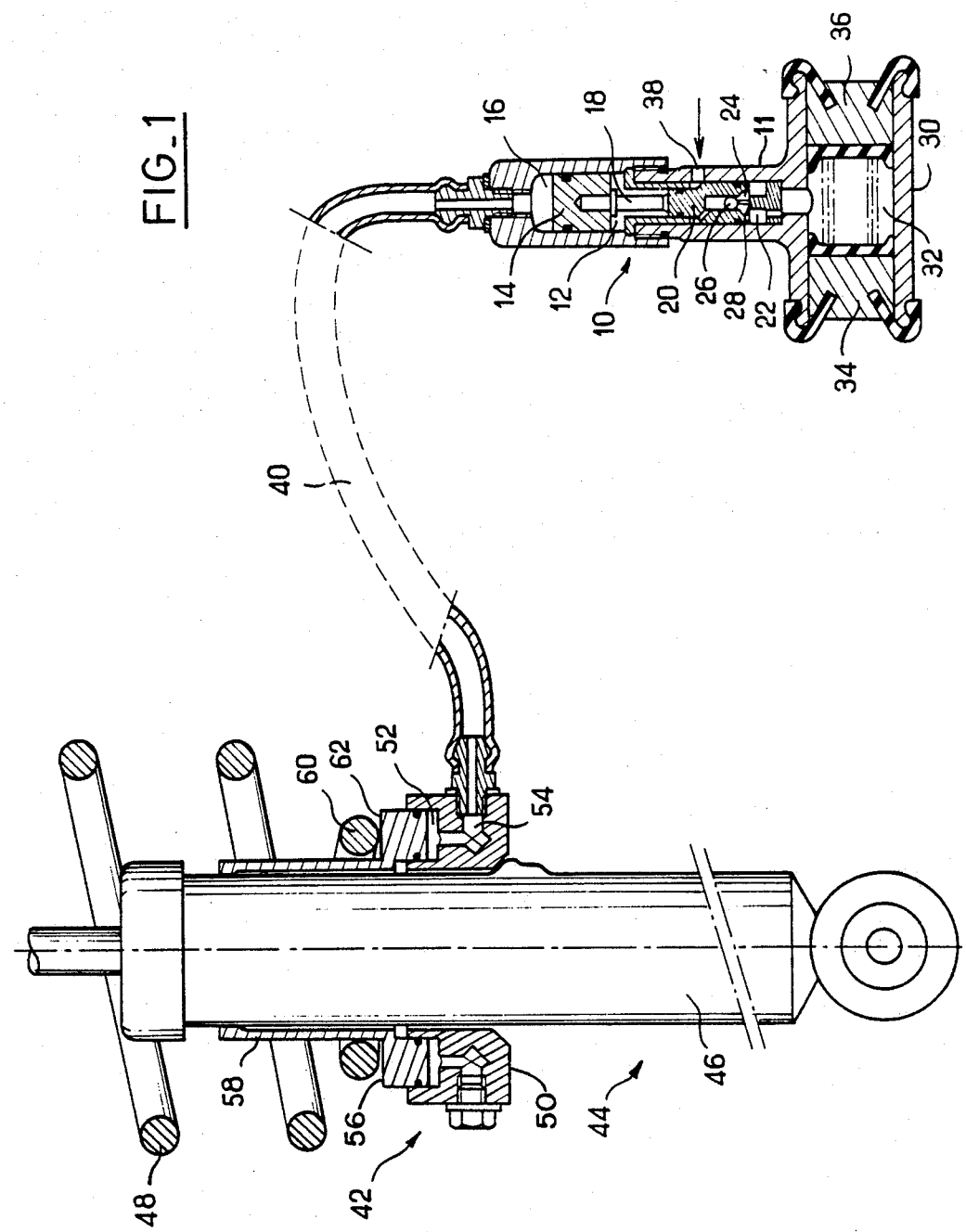

United States Patent [19]

Levrai

[11] Patent Number: 4,824,180
[45] Date of Patent: Apr. 25, 1989

[54] BRAKE CORRECTOR SUBJECT TO THE LOAD OF A VEHICLE

[75] Inventor: Roland Levrai, Stains, France

[73] Assignee: Bendix France, Drancy, France

[21] Appl. No.: 153,618

[22] Filed: Feb. 8, 1988

[30] Foreign Application Priority Data

Feb. 26, 1987 [FR] France .................... 8702538

[51] Int. Cl.⁴ ............... B60T 8/18; B60T 8/22
[52] U.S. Cl. .................. 303/22.5; 303/22.8; 188/195
[58] Field of Search ............. 188/321.11, 272, 195; 280/714, 710, 703; 267/34; 180/290; 303/22.1, 22.5, 22.8

[56] References Cited

U.S. PATENT DOCUMENTS

| | | | |
|---|---|---|---|
| 2,574,426 | 11/1951 | Trevaskis | 303/22.8 |
| 3,386,538 | 6/1968 | Cairns et al. | 188/195 |
| 3,628,810 | 7/1970 | Graef | 280/710 |
| 4,040,674 | 8/1977 | Marcillaud | 303/22 R |
| 4,159,105 | 6/1979 | Vander Laan et al. | 280/710 |
| 4,469,378 | 9/1984 | Birkenbach | 303/22.8 |
| 4,624,507 | 11/1986 | Carre et al. | 303/22.5 |
| 4,651,977 | 3/1987 | Buma | 280/714 |

FOREIGN PATENT DOCUMENTS

| | | | |
|---|---|---|---|
| 0203704 | 12/1986 | European Pat. Off. | 188/195 |
| 1505329 | 4/1970 | Fed. Rep. of Germany | 188/195 |
| 3224295 | 12/1983 | Fed. Rep. of Germany | |
| 0177755 | 10/1983 | Japan | 303/22.5 |
| 0987689 | 3/1965 | United Kingdom | 303/22.5 |

Primary Examiner—Andres Kashnikow
Assistant Examiner—Timothy Newholm
Attorney, Agent, or Firm—Larry J. Palguta; Ken C. Decker

[57] ABSTRACT

A brake corrector (10) subject to the load of a vehicle is equipped with a fluidic pressure sensor (42; 142), the corrector (10) comprising a body (11) having a bore (12) in which is mounted slidably a piston (20) designed to interact with a valve element (26) in order to control a fluid passage between an inlet (38) and an outlet (32) of the corrector (10). The sensor (42; 142) comprises a piston (56; 156) mounted slidably in a cylinder (50, 150) and moved in the cylinder (50, 150) by way of a suspension spring (48; 148) of the vehicle in which the assembly is mounted, the variation of force exerted on the piston (56; 156) causing a variation in pressure of the fluid contained in the cylinder (50, 150). The corrector (10) and sensor (42; 142) are connected fluidically so that the pressure variation acts on the piston (20) of the corrector. The sensor (42; 142) is shaped so as to interact with one end (60) of the suspension spring (48; 148) and has a shape substantially matching that of the one end (60).

3 Claims, 2 Drawing Sheets

FIG_1

BRAKE CORRECTOR SUBJECT TO THE LOAD OF A VEHICLE

The present invention relates to brake correctors and more particularly to such a corrector subject to the load of a vehicle.

In order to save space and reduce the number of components, it is desirable to connect a brake corrector directly to the suspension of a vehicle, for the purpose of varying the braking of the wheels of the vehicle as a function of its load.

The document No. GB-A-1,577,029 makes known a brake corrector subject to the load of a vehicle, which is arranged at one end of a suspension spring of the vehicle and which is connected to the spring by means of a cam assembly, so as to vary the brake pressure as a function of the load. The disadvantages of this device are that it comprises a large number of components, and this makes it expensive and unreliable.

To overcome the disadvantages of a mechanical connection between a corrector and the suspension of a vehicle, it has been proposed to connect the corrector to the suspension hydraulically.

The document No. FR-A-1,288,940 makes known a vehicle braking system, in which a hydraulic transmitter is mounted between the suspension leaf-spring and the vehicle chassis, this transmitter being connected hydraulically to a brake corrector so as to cause the latter to operate as a function of the vehicle load.

The disadvantages of this device are that it is bulky and can impede the movement of the suspension. Moreover, this device is not suitable for use with a helical suspension spring.

It is therefore an object of the present invention to provide a brake corrector subject to the load of a vehicle, which is of simple design, not at all bulky and reliable and which is easy to install.

According to the present invention, there is provided a brake corrector intended to be subject to the load of a vehicle equipped with a fluidic pressure sensor, the corrector comprising a body having a bore, in which is slideably mounted a piston designed to interact with a valve element in order to control a fluid passage between an inlet and an outlet of the corrector, the fluidic pressure sensor comprising a piston slideably mounted in a cylinder and intended to be moved in the cylinder by means of a suspension spring of the vehicle on which the assembly is mounted, the variation in force exerted on the piston causing a variation in pressure of the fluid contained in the cylinder, the corrector and the fluidic pressure sensor being connected fluidically, in such a way that the pressure variation acts on the piston of the corrector, characterized in that the fluidic pressure sensor is shaped so as to interact with one end of the suspension spring and has a shape substantially matching that of the one end.

Figure 2:
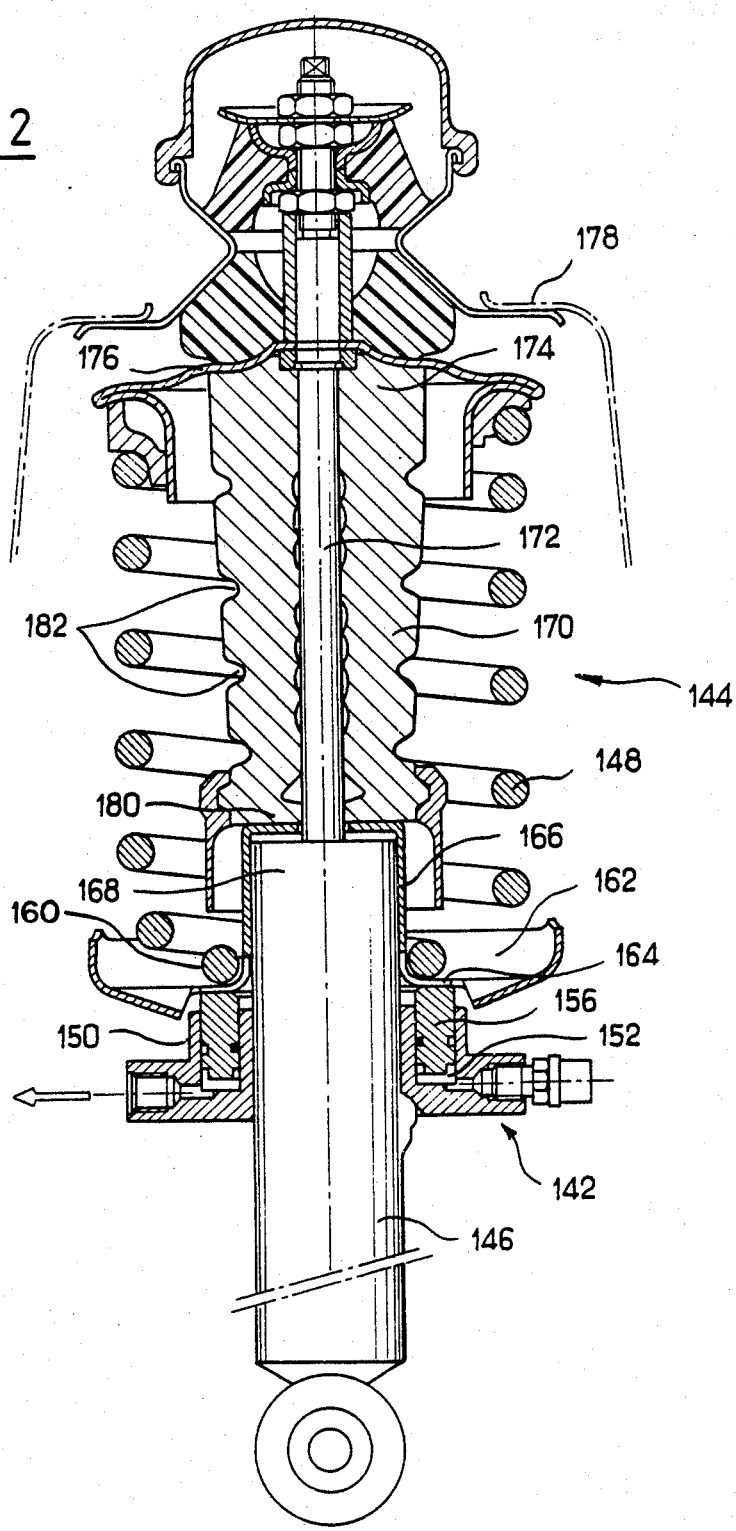

The invention will now be described by way of example with reference to the accompanying drawings in which:

FIG. 1 is a diagrammatic view, in longitudinal section, of a brake corrector subject to the load of a vehicle, according to the invention; and FIG. 2 is a view of a second embodiment in longitudinal section.

As shown in FIG. 1, a brake corrector 10 which, in the example illustrated, is produced integrally with a wheel cylinder of a drum brake (not shown) comprises a corrector body 11 which has a stepped bore 12. A control piston 14 is slideably mounted sealingly in a part 16 of widened diameter of the stepped bore 12. The control piston 14 has an actuating rod 18 which bears on a piston 20 slideably mounted sealingly in a part 22 of reduced diameter of the stepped bore 12. The piston 20 is equipped with a valve seat 24 intended to be closed selectively by means of a ball 26 interacting with a stem 28 integral with the bottom of the stepped bore 12. The wheel cylinder comprises a body 30 having a bore 32, in which two actuating pistons 34, 36 are slideably mounted sealingly. The corrector body 11 comprises a hydraulic inlet 38 intended to be connected to a source of hydraulic fluid under pressure, for example a master cylinder (not shown).

The part 16 of the stepped bore 12 is connected, by means of a flexible hose 40, to a fluidic pressure sensor 42 mounted on a suspension element 44. The suspension element 44 comprises a shock-absorber 46 and a suspension spring 48, and it is intended to be mounted between the chassis and a suspended part of the vehicle (these not being shown).

The fluidic pressure sensor 42 which, in the example illustrated, is a hydraulic sensor comprises an annular collar 50 mounted fixedly on the shock-absorber 46 and has an annular groove 52 connected to the flexible hose 40 via a passage 54. An annular piston 56 is slideably mounted sealingly in the annular groove 52 and comprises a tubular sleeve 58 which is arranged with slight play round the shock-absorber 46. One end 60 of the suspension spring 48 comes up against an annular surface 62 of the annular piston 56.

The corrector operates in the following way:

An increase in the load of the vehicle causes a corresponding variation in the force exerted by the suspension spring 48 on the annular piston 56, thereby bringing about an effective pressure variation in the annular groove 52. The movement of the annular piston 56 causes a corresponding action on the control piston 14 which, via the actuating rod 18 and the piston 20, acts on the ball 26, thereby controlling the flow of fluid between the master cylinder and the wheel cylinder 30. In a similar way, a reduction in the vehicle load has the opposite effect on the annular piston 56, causing a decrease of the fluid pressure in the annular groove 52, thereby causing the ball 26 to close on its seat 24.

FIG. 2 shows a second embodiment of the suspension element which comprises a second means for transmitting the suspension force to the annular piston. In this second embodiment, the suspension element 144 comprises a bearing element 162 which is slideably mounted round the shock-absorber 146 and which is up against the annular piston 156 of the pressure sensor 142. The bearing element 162 comprises an annular part 164, on which bears one end 160 of the suspension spring 148, and a cup-shaped part 166 surrounding one end 168 of the shock-absorber 146. The suspension element 144 also comprises a sleeve 170 made of elastomeric material, which is arranged round a rod of the piston 172 of the shock-absorber 146 and one end 174 of which is mounted fixedly on a support plate 176 integral with the vehicle chassis 178.

The sleeve 170 is of such a length that, when the vehicle on which the device is fitted is empty, the end 180 does not come up against the bearing element 162. In this case, only the force of the suspension spring 148 is transmitted to the annular piston 156. If the vehicle load increases, the shock-absorber 146 is compressed, and the end 180 of the sleeve 170 comes up against the part 166 of the bearing element 162, in order to exert an additional force on the annular piston 156. The sleeve 170 has annular slots 182 which ensure progressive deformation of the sleeve 170 when the vehicle load increases. The force exerted on the annular piston 156 by the combination of the suspension spring 148 and of the sleeve 170 is a more accurate reflection of the load of the vehicle.

It is possible for the fluidic sensor to be a pneumatic sensor, in which case it will be necessary to modify accordingly the shape and dimensions of the annular piston 56, 156 and of the piston 14 of the corrector, as is well known to a person skilled in the art.

One of the many advantages of the sensor of the corrector according to the present invention is that the support used for it is a shock-absorber already present in the vehicle, thus making it possible to avoid using a special support for this sensor.

I claim:

1. A fluid pressure sensor connected fluidically to a brake corrector subject to the load of a vehicle having at least one suspension element mounted between a support plate connected with a vehicle chassis and a suspended part of said vehicle, said suspension element comprising coaxially a shock-absorber having one end connected to said suspended part, a suspension spring, a rod having one end connected to a piston of said shock-absorber, and an elastomeric sleeve arranged around said rod, the other end of said rod and associated ends of said suspension spring and said elastomeric sleeve being mounted to said support plate, said fluid pressure sensor comprising an annular piston mounted slidably and sealingly in an annular groove provided in an annular collar surrounding said shock-absorber, one end of said suspension spring being received in an annular part of a bearing element which is mounted slidably around said shock-absorber and engaging said annular piston, said bearing element having a central cup-shaped part surrounding the shock-absorber and facing one end of said elastomeric sleeve, said central cup-shaped part being integral with said annular part, and the end of the elastomeric sleeve opposite said support plate engaging with said central cup-shaped part in order to exert force upon the annular piston in addition to force exerted by the spring, via the bearing element, upon the annular piston.

2. The fluid pressure sensor in accordance with claim 1, wherein the elastomeric sleeve includes slots in the circumference thereof which enable progressive deformation of the sleeve as loading of the vehicle increases.

3. The fluid pressure sensor in accordance with claim 1, wherein said annular part engages directly the annular piston.

* * * * *